(12) United States Patent
Tan

(10) Patent No.: US 8,108,309 B2
(45) Date of Patent: Jan. 31, 2012

(54) PROTECTING A MANUFACTURED ITEM FROM COUNTERFEITING

(75) Inventor: Cheng Tan, Cupertino, CA (US)

(73) Assignee: Provalidate, Cupertino, CA (US)

( * ) Notice: Subject to any disclaimer, the term of this patent is extended or adjusted under 35 U.S.C. 154(b) by 922 days.

(21) Appl. No.: 11/754,852

(22) Filed: May 29, 2007

(65) Prior Publication Data

US 2010/0017330 A1    Jan. 21, 2010

(51) Int. Cl.
   G06F 21/00 (2006.01)
   G06G 1/14 (2006.01)
   G06Q 20/00 (2006.01)

(52) U.S. Cl. .................. 705/50; 705/22; 705/28; 705/67

(58) Field of Classification Search .................. 705/50, 705/22, 28, 67; 707/104.1
   See application file for complete search history.

(56) References Cited

U.S. PATENT DOCUMENTS

| | | |
|---|---|---|
| 3,833,795 A | 9/1974 | Shoshani |
| 4,463,250 A | 7/1984 | McNeight et al. |
| 4,720,860 A | 1/1988 | Weiss |
| 4,856,062 A | 8/1989 | Weiss |
| 4,885,778 A | 12/1989 | Weiss |
| 5,267,756 A | 12/1993 | Molee et al. |
| 5,367,148 A | 11/1994 | Storch et al. |
| 5,450,491 A | 9/1995 | McNair |
| 5,592,561 A | 1/1997 | Moore |
| 5,661,284 A | 8/1997 | Freeman et al. |
| 5,751,812 A | 5/1998 | Anderson |
| 5,768,384 A | 6/1998 | Berson |
| 6,005,476 A | 12/1999 | Valiulis |
| 6,069,955 A | 5/2000 | Coppersmith et al. |
| 6,105,004 A | 8/2000 | Halperin et al. |
| 6,212,638 B1 | 4/2001 | Lee et al. |
| 6,249,227 B1 | 6/2001 | Brady et al. |
| 6,442,276 B1 | 8/2002 | Doljack |
| 6,591,252 B1 | 7/2003 | Young |
| 6,629,054 B2 | 9/2003 | Makhija et al. |
| 6,633,983 B1 | 10/2003 | Hong et al. |
| 6,681,214 B1 | 1/2004 | Doljack |
| 6,798,719 B1 | 9/2004 | Muta et al. |
| 6,880,753 B2 | 4/2005 | Ogihara et al. |
| 6,898,286 B2 | 5/2005 | Murray |
| 6,996,543 B1 | 2/2006 | Coppersmith et al. |
| 7,117,363 B2 | 10/2006 | Lincoln et al. |

(Continued)

FOREIGN PATENT DOCUMENTS

GB    2342743    4/2000

OTHER PUBLICATIONS

Office Action dated Apr. 19, 2010 for U.S. Appl. No. 12/035,280.

(Continued)

*Primary Examiner* — Charles C Agwumezie
(74) *Attorney, Agent, or Firm* — Convergent Law Group LLP

(57) ABSTRACT

A method and system are described for protecting a manufactured item from counterfeiting. The manufactured item, which is marked with an identifier, such as a serial number, is associated with a code generator that has secret functions and data for generating verification codes. The manufactured item is then supplied along with the corresponding code generator. Thereafter, the identifier from the manufactured item and the verification code generated by the code generator are used to verify authenticity of the manufactured item.

12 Claims, 12 Drawing Sheets

| | Shenzhen fake price (US$) | Hong Kong real price (US$) |
|---|---|---|
| HANDBAGS | | |
| LV monogram single handle | $12 | $650 |
| LV monogram double handle | $12 | $650 |
| Gucci black-and-white logo print | $12 | $500 |
| Hermes Birkin red leather | $60 | $8500 |
| Tod's red leather tote | $12 | $800 |
| OTHER GOODS | | |
| Cartier tank watch | $12 | $1500 |
| Mont Blanc ball pen | $1.25 | $125 |
| LV suitcase | $15 | $1250 |
| LV cigarette case | $2.50 | $75 |
| LV lipstick case | $3 | $75 |
| TOTAL (10 items) | US$141.75 | US$14,125 |

U.S. PATENT DOCUMENTS

| | | | |
|---|---|---|---|
| 7,182,257 | B2 | 2/2007 | Ogihara et al. |
| 2003/0085797 | A1 | 5/2003 | Li |
| 2003/0177095 | A1 | 9/2003 | Zorab et al. |
| 2005/0038756 | A1 | 2/2005 | Nagel |
| 2006/0005027 | A1 | 1/2006 | Tseng |
| 2006/0175401 | A1 | 8/2006 | Roberts |
| 2006/0242698 | A1 | 10/2006 | Inskeep et al. |
| 2006/0259363 | A1 | 11/2006 | Jhetam |
| 2006/0266827 | A1 | 11/2006 | Hamilton |
| 2006/0273157 | A1 | 12/2006 | Behm et al. |
| 2006/0282385 | A1 | 12/2006 | Cheng et al. |
| 2007/0016462 | A1 | 1/2007 | Atkinson et al. |
| 2007/0055883 | A1 | 3/2007 | Kruse |
| 2007/0179978 | A1* | 8/2007 | Lee et al. .................. 707/104.1 |
| 2007/0180248 | A1 | 8/2007 | Gorostidi et al. |
| 2007/0219916 | A1* | 9/2007 | Lucas ............................ 705/58 |
| 2008/0011841 | A1 | 1/2008 | Self et al. |
| 2008/0046263 | A1* | 2/2008 | Sager et al. ....................... 705/1 |
| 2008/0238611 | A1* | 10/2008 | Costa et al. .................... 340/5.8 |
| 2009/0037204 | A1 | 2/2009 | Tan |
| 2009/0212101 | A1 | 8/2009 | Tan |
| 2010/0299263 | A1* | 11/2010 | Grant et al. ..................... 705/50 |

OTHER PUBLICATIONS

PCT International Search Report and Written Opinion issued May 29, 2007 for PCT/US2007/073236.

Counterfeit.com Buyer's guide; http://counterfeit.com/main/162/BUYERS_GUIDE.html pp. 1-4, May 2007.

Counterfeiting—Bags of Trouble; http://www.asiapacificms.com/articles/korea_counterfeits/ pp. 1-4, May 2007.

Actividentity—The trusted choice for identity assurance; http://www.actividentity.com/index.php pp. 1-4, May 2007.

Entrust IdentityGuard Mini Token; http://www.entrust.com/strong-authentication/identityguard/tokens/index.htm pp. 1-4, May 2007.

InCard Technologies, The ICT DisplayCards: Security Made Simple; http://www.incardtech.com/products.html pp. 1-2, May 2007.

OpSec Security Brand Protection Business Unit; http://www.opsecsecurity.com/bpms/htm pp. 1-2, May 2007.

RSA, The Security Division of EMC, RSA SecurID; http://www.rsa.com/node.aspx?id=1156 pp. 1-2, May 2007.

Scott Contini and Yiqun Lisa Yin, Improved Cryptanalysis of SecurID, Oct. 21, 2003, pp. 1-25.

Factsheet: The impact and scale of counterfeiting, First Global Congress on Combating Counterfeiting, May 2004; http://www.anti-counterfeitcongress.org pp. 1-4.

The Cult of the Luxury Brand, 2006, Radha Chadha and Paul Husband, Nicholas Brealey International, ISBN-13: 978-1-904838-05-0, pp. 276-279.

Counterfeiting Exposed, Types of Technology Solutions, 2003, Hopkins et al., Wiley, ISBN-13: 978-0471269908, pp. 252-259.

PCT International Search Report and Written Opinion of the International Searching Authority, issued May 29, 2007, application No. PCT/US2007/073236.

* cited by examiner

|  | Shenzhen fake price (US$) | Hong Kong real price (US$) |
|---|---|---|
| HANDBAGS | | |
| LV monogram single handle | $12 | $650 |
| LV monogram double handle | $12 | $650 |
| Gucci black-and-white logo print | $12 | $500 |
| Hermes Birkin red leather | $60 | $8500 |
| Tod's red leather tote | $12 | $800 |
| OTHER GOODS | | |
| Cartier tank watch | $12 | $1500 |
| Mont Blanc ball pen | $1.25 | $125 |
| LV suitcase | $15 | $1250 |
| LV cigarette case | $2.50 | $75 |
| LV lipstick case | $3 | $75 |
| TOTAL (10 items) | US$141.75 | US$14,125 |

FIG. 1

PROTECTING A MANUFACTURED ITEM FROM COUNTERFEITING

BACKGROUND OF THE INVENTION

Counterfeit goods pose a significant problem for manufacturers and consumers of high-ticket items like luxury watches, designer goods and apparel. The quality of high-grade counterfeits has risen to the level where they are hard to tell apart from the genuine items. In many cases, the counterfeits include correct markings such as legitimate serial numbers and all the peripheral materials like certificates of authenticity, warranty cards, tags, seals, manuals, boxes and packaging. Unfortunately, most of these can be forged. Serial numbers alone are insufficient protection because a counterfeiter can mass produce copies of an item, all having the same valid serial number.

FIG. 1 is a diagram of a table reproduced from "The Cult of the Luxury Brand, 2006, Radha Chadha and Paul Husband, Nicholas Brealey International, ISBN-13 978-1-904838-05-0" showing the price difference between a sample of Grade A fakes, which the authors describe as "spitting images of the real thing", and the real items. When a fake is sold and bought as a fake, both seller and buyer are at least knowledgeable of the fact. But so long as high quality fakes can be made cheaply, there will be the incentive by some people to pass them off as real.

Chadha and Husband state that the World Customs Organization's estimate for the annual sale of counterfeit luxury goods is US$27 billion, which is a quarter of the legitimate luxury industry.

Current Anti-Counterfeiting Technologies

Current technology solutions to thwart counterfeiting may be classified as overt or covert. Overt markers such as holograms, color-shifting films, optically variable inks and devices, fluorescent inks, intaglio printing, and watermarks are meant to be hard to forge, and these markers are intended for the consumer. For these solutions to be successful, the consumer needs to be educated for what a genuine marker looks like.

Covert markers include reactive, infrared, and ultraviolet inks. These markers are intended more for manufacturers, investigators, customs officials and law enforcement. They may require specialized readers, and they are also meant to be hard to forge. They are often hidden to avoid discovery by counterfeiters.

There are machine-readable markers as well, and these may be overt or covert. They include radio frequency ID, magnetic-based systems, and laser marking. These too require specialized readers. Distribution of these readers may need to be controlled as the security of the system may be compromised if a reader made its way into the wrong hands.

These solutions will fail if a counterfeiter is able to buy and use the anti-counterfeiting technology from the marketplace. Overt solutions fail too if the counterfeiter is able to produce forged markers that look good enough, and consumers are unable to tell that they are not genuine.

Verifiability by Consumers is Desirable

A fake that is sold as the real thing hurts the manufacturer and defrauds the consumer. Because of the large difference in price and the potential for profit, some counterfeiters and unscrupulous sellers have the incentive to do this. Many consumers at the same are motivated to buy genuine items at good prices, and good discounts will always be tempting. More transactions are also made remotely and over the internet. Unfortunately, there is not an easy way to authenticate items especially from afar.

BRIEF SUMMARY OF THE INVENTION

The present invention provides a method and system for protecting a manufactured item from counterfeiting, where the manufactured item is marked with an identifier, such as a serial number. The identifier is associated with a code generator that has secret functions and data for generating verification codes. The manufactured item is then supplied along with the corresponding code generator. Thereafter, the identifier from the manufactured item and the verification code generated by the code generator are used to verify authenticity of the manufactured item.

According to the method and system disclosed here, manufactured items are protected from counterfeiting by linking each item to a code generator device that is low-cost, easy to manage, yet hard to forge. Verifiability of the link can be done easily without the need for any specialized scanners or hardware. Remote verification can also be easily achieved.

BRIEF DESCRIPTION OF SEVERAL VIEWS OF THE DRAWINGS

FIG. 1 is a table showing the difference in prices between Grade A counterfeits and the genuine items.

DETAILED DESCRIPTION OF THE INVENTION

Figure 2A:
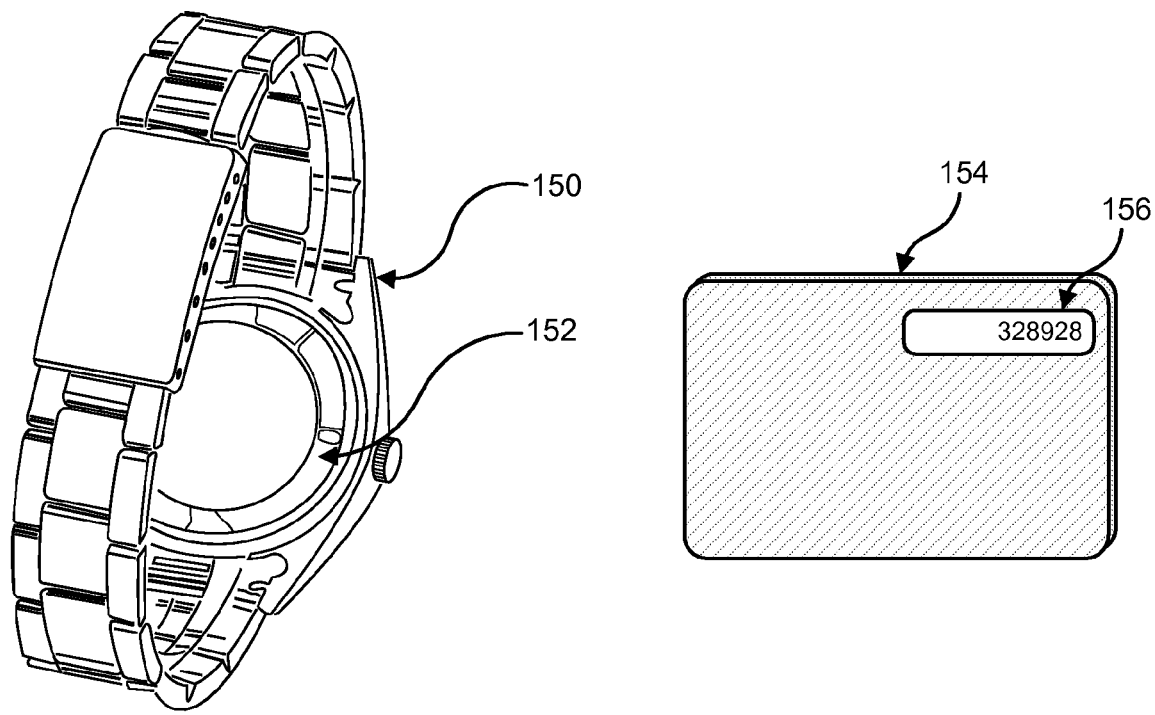
FIG. 2A shows a protected watch and its code generator.

The present invention relates to protecting manufactured items from counterfeiting. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain steps. However, the method and system operate effectively for other methods having different and/or additional steps not inconsistent with the present invention.

Introduction

Hardware tokens like the SECURID™ token from RSA SECURITY®, the IDENTITYGUARD™ Mini Token from ENTRUST®, and the DISPLAYCARD™ from INCARD TECHNOLOGIES® provide means for generating and displaying a series of seemingly random characters either at regular intervals or on demand.

These devices are used to strengthen user authentication in network security and financial transaction applications. The codes that they generate are used to augment user-chosen or assigned passwords. (We will use the term password to refer to both alphanumeric passphrases and numeric Personal Identification Number (PIN) codes). These passwords, while they are supposed to be secret, may not remain so as they are static and may be compromised in a variety of ways that include brute force dictionary attacks, deception, spying, and computer or database breaches.

With these devices and depending on the system, a user creates a One Time Password (OTP) by either combining their password with the authentication code displayed by their hardware token, or by keying in their password to obtain an authentication code. The One Time Password is then submitted to authenticate and authorize the user.

A management system used in conjunction with the hardware token is also in possession of the secrets stored in the device and it is able to compute the expected authentication code. As part of processing an authentication request, the authentication sever can perform a match to see that the submitted authentication code matches the expected code. If there is a mismatch, the entire authentication step fails and the user is denied.

There are currently two main approaches used by the token providers to generate the authentication codes. Time-based tokens run with internal clocks that are synchronized with the clocks on their management systems. Typically, a new authentication code is generated once every minute with tokens of this type. Time drift between the clocks on the token and its management system pose a problem, but the management systems are typically capable of detecting and correcting for this drift without affecting the user.

Event-based tokens use a different approach, and tokens of this type do not need an internal clock. Authentication codes are instead generated on demand. Such tokens may be programmed to require the entry of a PIN into the token to initiate the generation of a new code. A system may also be configured to take a PIN from the server to initiate the generation of the new code.

The authentication codes that are displayed by these hardware tokens are generated by hash, encryption, or custom data transformation functions that are invoked to create a new sequence of characters. These functions tend to have the common trait of producing function outputs where the inputs cannot be deduced.

Hash functions additionally have the property of mapping encoded information of arbitrary length to fixed-length sequences such that the function outputs are well distributed throughout the output space so that collisions, where two different sequences of characters map to the same output, are minimized.

Common hash functions include MD5, the Secure Hash Algorithm (SHA) series of functions, and the Hashed Message Authentication Code One Time Password (HOTP) function.

Data encryption functions are also used in these tokens and they include the Data Encryption Standard (DES) and 3DES functions.

To generate the next sequence of characters, the code generation functions may take as inputs a seed, which may be different for every token, and some combination of the previous result, a sequence number, and in the case of time-based tokens, the elapsed and absolute time. The code generation function and the inputs used are kept secret.

There is no end to the authentication codes that can be generated, and the codes are impractical to predict without knowing the secrets. In the case of SECURID™, it has been shown that the best known method is able to discover the seed within $2^{40}$ (>1 trillion) result observations, and this is for a known hash function. In 15 years, there have been no reported breaches.

The hardware tokens are also tamper-resistant, and token lifetime is limited by device power. As of 2007, a sample of different hardware tokens has operating lifetimes that range from 3 to 8 years. Some event-based tokens also include non-volatile memory and they may allow the user to replace the batteries. The tokens are increasingly commoditized, and as of 2007, they can be bought for as low as $5 each.

The present invention provides a method and system for protecting a manufactured item from counterfeiting and the subsequent use of the counterfeit for fraud by linking the manufactured item to a code generator device that is low-cost, easy to manage, yet hard to forge. Verifiability of the link can be done easily without the need for any specialized scanners or hardware. Remote verification can also be easily achieved.

To protect a manufactured item, a manufacturer or a third-party service assigns an identifier, such as a serial number, to the item and marks the manufactured item with the identifier. The manufacturer or a third-party service associates the identifier with a code generator that has stored secrets for generating verification codes. The manufactured item is then supplied (e.g., sold) along with the corresponding code generator. Thereafter, the identifier from the manufactured item and the verification code generated by the code generator are used to verify authenticity of the manufactured item.

As used herein, the term manufactured item includes any type of article or device that is made or manufactured. The term can also apply to containers that may be used for shipping the manufactured items, for example. In this embodiment, the outside of the container could be marked with an identifier, and the container is then supplied (e.g., shipped) with a corresponding code generator.

FIGS. 2A, 2B, 2C, and 2D are diagrams illustrating exemplary embodiments of this anti-counterfeiting system for manufactured items using code generators.

FIG. 2A shows an example manufactured item in the form of a watch 150, and shows the back of the watch 152 where the identifier, e.g., a serial number, can be engraved. A code generator 154 is associated with the watch/identifier, and is initialized with stored secrets for computing verification codes. In one embodiment, the code generator 154 is linked to the serial number 152 by storing the code generator's secrets and the serial number in a verification database (not shown).

Figure 2B:
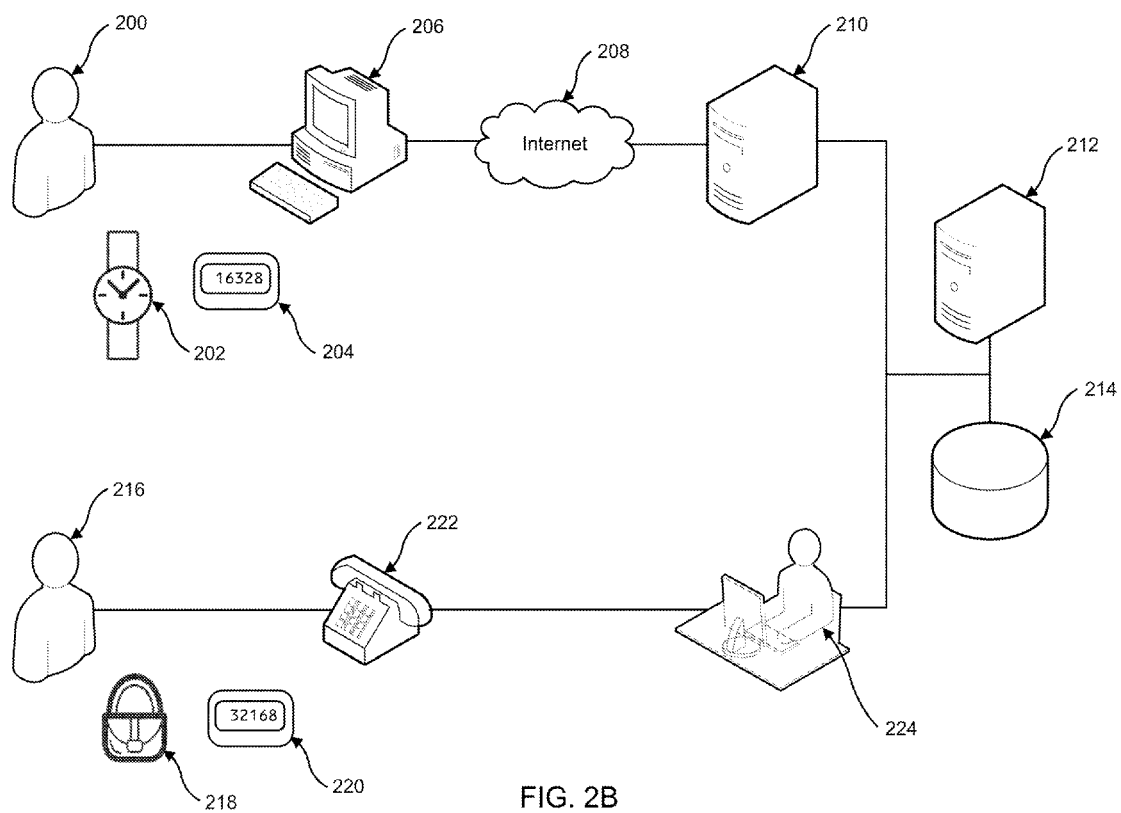
FIG. 2B shows two usage scenarios.
Figure 2C:
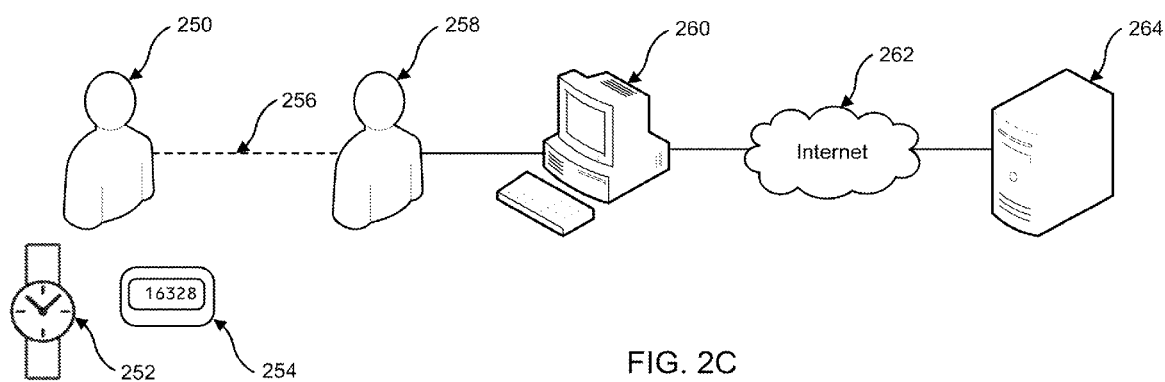
FIG. 2C shows a usage scenario with remote verification.

FIGS. 2B and 2C provide an overview of how the method may be used in practice to verify protected items. Although examples of manufactured items are shown as watches and handbags along with time-based tokens for protection, any type of manufactured items and tokens may be combined.

In FIG. 2B, watch 202 and handbag 218 are individual items that are protected by their own code generators 204 and 220, respectively. The manufacturer sets up each code generator with unique secrets through a code generator management system 212 and links the secrets to the item's serial number through a database 214.

When a person 200 wishes to check the authenticity of the watch 202, such as a buyer or service, sales, or distribution personnel, the person 200 may use a web browser on a computer 206 to navigate through the internet 208 to a verification section on the manufacturer's or third-party website. The person 200 then enters the serial number from the watch 202 and the current verification code from the watch's code generator 204.

The web or application server 210 then performs a check with the code generator management system 212 to validate the provided serial number and verification code. The code generator management system 212 retrieves the secrets that are linked to the serial number from the database 214 as part of this verification. The secrets allow the code generator management system 212 to compute the expected verification code, and it can then perform a comparison to see if this computed verification code matches the provided verification code. Validation is successful if the codes match, and unsuccessful otherwise.

If validation is successful, a confirmation message can be returned to person 200, and additional information that may be helpful can be shown. This may include:
1. Information about the model, style, color, date of manufacture, and warranty.
2. Photographs with distinguishing marks if appropriate.
3. Related accessories that are available.
4. Service history.
5. Reports of theft.

If validation is unsuccessful, a failure message and additional material can be displayed.

Person 216, who wants to check on a handbag 218, illustrates a different verification scenario. Person 216 uses a phone 222 to place a call to the manufacturer where a representative 224 assists. Person 216 provides the serial number from the handbag 218 and the current verification code from the handbag's code generator 220 to the representative 224. Representative 224 then performs a check with the code generator management system 212 to validate the provided serial number and verification code.

If validation is successful, representative 224 can confirm that the verification succeeded. Otherwise, representative 224 can say that verification failed. While not shown, other possible channels for verification may be implemented. These may include an interactive voice-response system, an automated telephone dial-tone system, and data-interchange via specialized electronic devices.

FIG. 2C shows an example of remote verification. Here, a buyer 258 is interested in purchasing a watch 252 from a remote seller 250. Watch 252 is protected by its code generator 254. Buyer 258 can ask seller 250 for the serial number and current verification code, and this information can be exchanged through any communication medium 256 such as voice, e-mail, or text messaging. Once the information is received, buyer 258 can use the verification channels provided by the manufacturer to check on the item. In this example, a browser on a computer 260 is used to connect to the manufacturer's website 264 through the internet 262 to perform the check. To allow this scenario, manufacturers can choose to have a reasonable window of time within which a verification code is valid. Close-to-real-time verification is documented below.

Figure 2D:
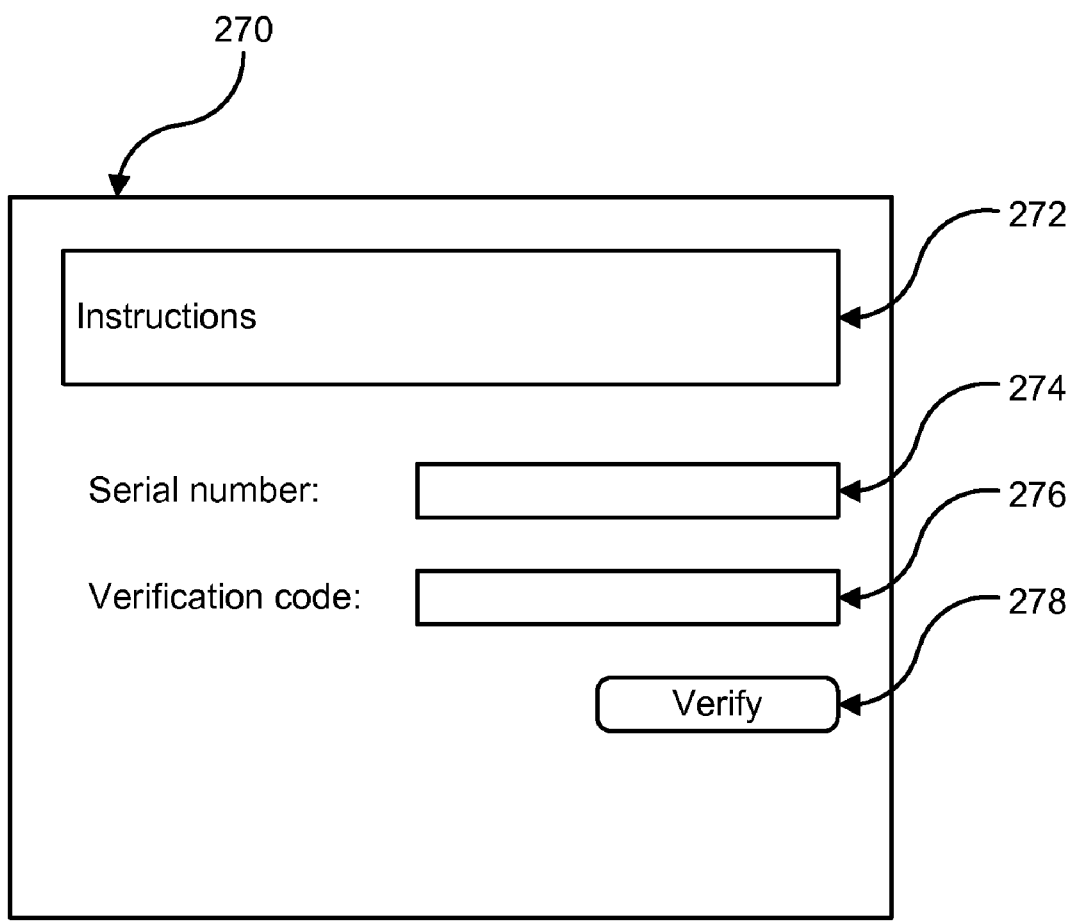
FIG. 2D shows an example of the verification user interface on a web page.

FIG. 2D shows an example of a web page 270 with user interface elements for verification. Text block 272 can give an introduction and instructions for reading the serial number and the current verification code from the code generator. Input text boxes 274 and 276 are for the user to enter the serial number and the verification code respectively. Input button 278 submits the verification request.

Item Identifier

Each item is marked with at least one identifier. This may be a singular identifier, such as a serial number, that is substantially unique to each item, multiple identifiers that together identify the item, multiple identifiers that identify constituent items, or it might be one or more identifiers that are assigned to a batch of items.

The identifiers are best made permanent, and placed or attached to the item in as tamper-proof a way as practical, or made to self-destruct when removed. The identifier markings are not limited to visual means and other technology may be used, either in addition or exclusively. Additional overt, covert, human-readable, or machine-readable identifier markings may be used to provide multiple ways for confirmation. In an electronic item, the identifier may be stored in Read-Only Memory (ROM).

If it is undesirable to mark the item with an identifier, the identifier can be placed on a separate object such as a card, document, or tag that accompanies the item, but this is not preferred.

Figure 3:
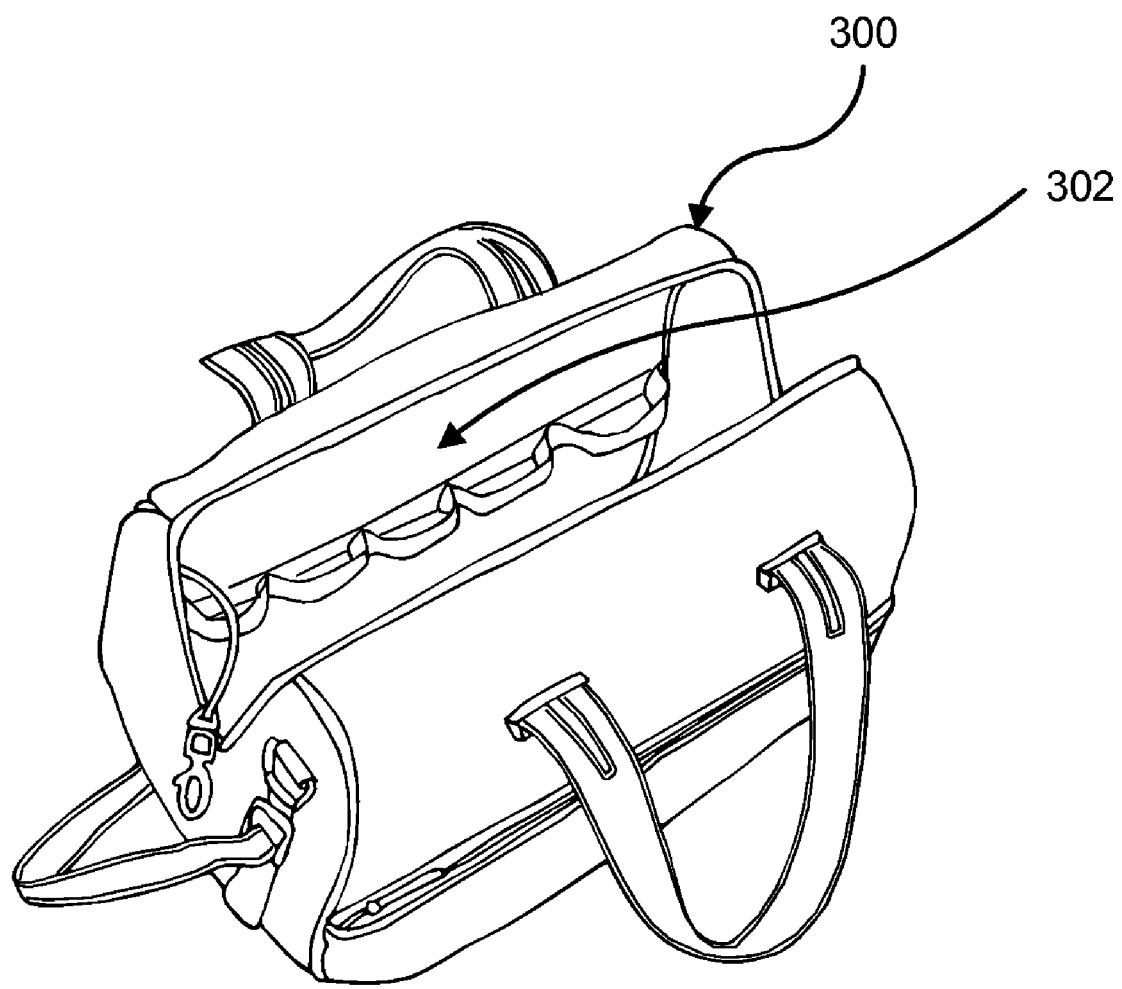
FIG. 3 shows a bag's interior as an example of where item identifiers can be placed.

Referring again to FIGS. 2A and 3, typical locations are shown for item identifiers on manufactured items. FIG. 2A shows the caseback 152 of a watch 150 where a serial number can be engraved. FIG. 3 shows the interior 302 of a bag 300 where a plate with a serial number can be attached.

Code Generator Design

Figure 4A:
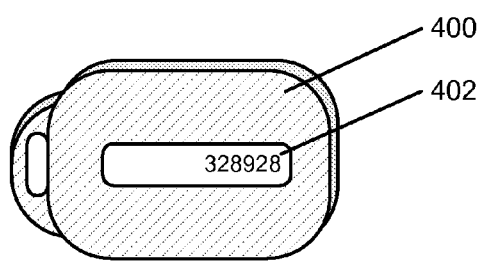
FIGS. 4A, 4B, 4C and 4D show the form factors of some existing hardware tokens.
Figure 4B:
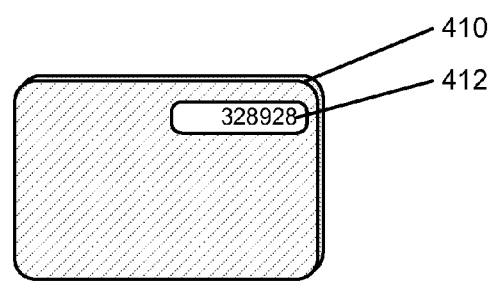

The code generator may be either a hardware device or embedded software with computer instructions for generating verification codes. If the code generator is a device, it is commonly referred to as a hardware token. FIGS. 4A and 4B show examples of form factors for hardware tokens. FIG. 4A shows a token as a key fob 400, and FIG. 4B shows a token as a card 410. They each have electronic displays 402 and 412, respectively that show current verification codes. If the code generator is software, a function can be provided for displaying the current verification code. These verification codes are typically a set of numeric or alphanumeric characters, and they are derived, in whole or in part, from the output of the code generation function.

Current code generators may be time-based, where an internal clock or timer triggers the generation of new verification codes at predictable intervals, or they may be event-based, where the verification codes are generated on demand.

Figure 4C:
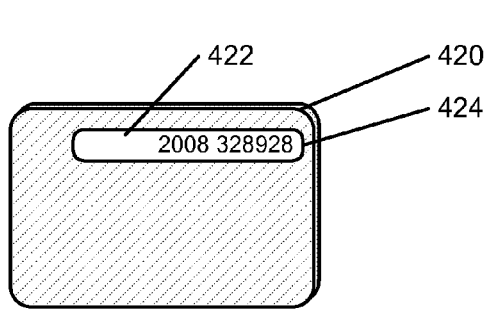

If time-based code generators are chosen, the manufacturer may choose to allow a time window within which a verification code is valid. FIG. 4C shows a variant of a time-based code generator 420 with electronic display 424 where a sequence number or time code 422 is shown embedded in the verification code. Embedding the time code 422 may be helpful for performing close-to-real-time verification which is disclosed later in the document. The time code 422 in FIG. 4C is for illustration only. It does not need to precede the verification code and it does not have to be encoded as shown. The encoding can take any form and it can be intermingled with the verification code so long as it is extractable by the verification system.

Figure 4D:
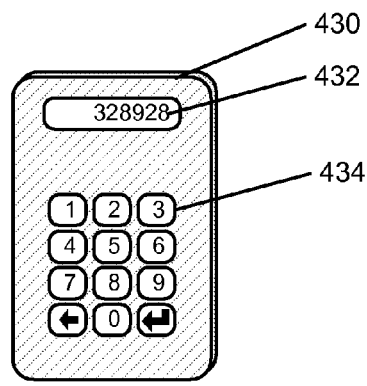

FIG. 4D shows an example of an event-based token. Tokens of this type typically have one or more buttons to initiate retrieval of a new verification code. In this example, a token in the form of a card 430 has an electronic display 432 for showing the PIN code as it is entered as well as the new verification code. A numeric keypad 434 is used for PIN code entry.

If event-based code generators are chosen, it may be most secure to have a system where a person making a verification request is assigned a PIN code by the verification system at the start of the request, possibly after entering some preliminary information such as the item identifier. The person is then asked to enter this PIN into the code generator to obtain the current verification code.

Other variants of event-based code generator systems are possible. A PIN code could be pre-assigned and come with the code generator, and the user enters this PIN to obtain a new verification code. A system could also come without the need for PIN code entry, and new verification codes could be generated with the push of a button. If either of these event-based system variants is chosen, it might be helpful to embed an extractable sequence number in the verification code to tell the verification system where the token is at in its sequence of generated verification codes. This sequence number would be useful for computing the expected verification code, and the verification system can also use it to enforce a monotonically increasing sequence with successful verification, so as to disallow the replay of previously generated codes.

Initializing the Code Generator

Depending on the provider of the code generator and the code generator's management system, there may be steps needed to prepare the code generator for use. This may include specifying information that includes a combination of the following:
1. A function for generating the verification codes.
2. A seed for the code generation function. This may be a number or a string of characters.
3. The start time. This would be synchronized with the clock on the code generator's management system.
4. The absolute time.
5. The code generator's identifier.

When the code generator is ready for use, the information that is needed by the code generator's management system to compute the expected verification code that is displayed by the code generator is called the secrets. These secrets will be used during verification, and it may include some combination of the information used to initialize the code generator, and possibly additional information such as the code generator's identifier or serial number.

Figure 5:
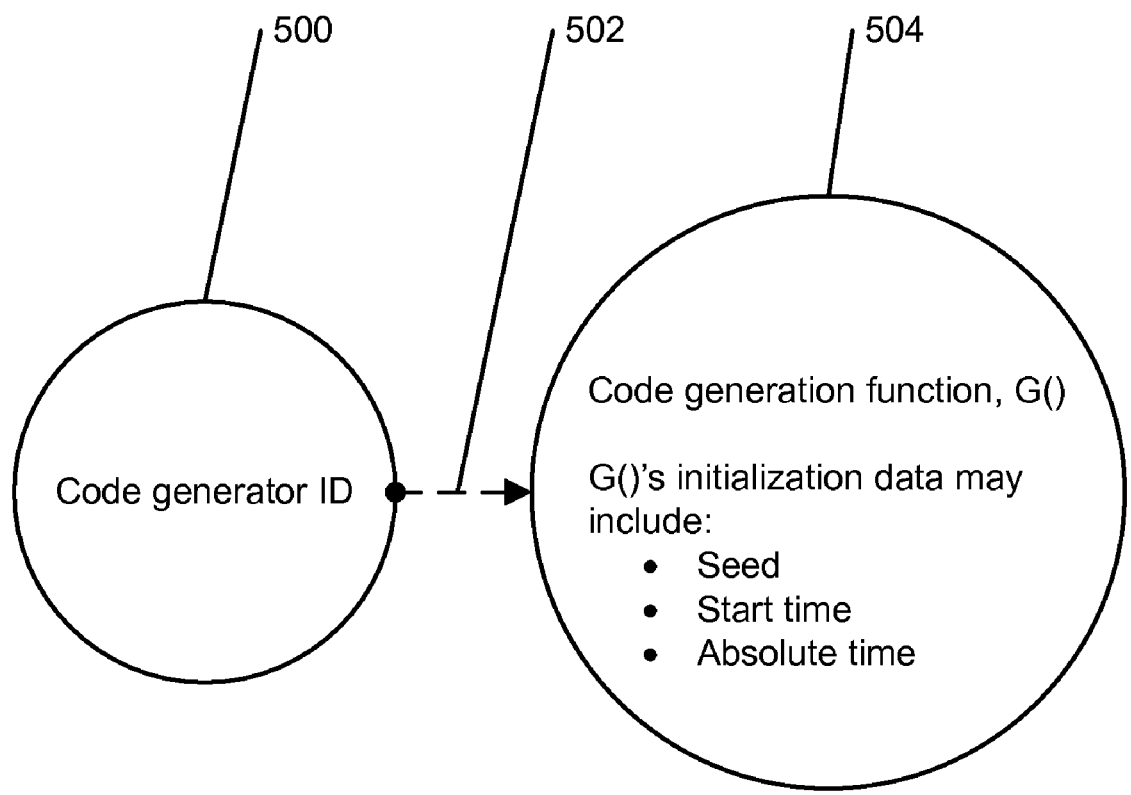
FIG. 5 is a diagram showing code generator secrets and the indirection through a code generator ID.

FIG. 5 shows a code generator identifier 500 which may be used on some systems to hide the specifics of the code generator's secrets 504 through indirection 502.

Associating the Item Identifier with the Code Generator's Secrets

Figure 6A:
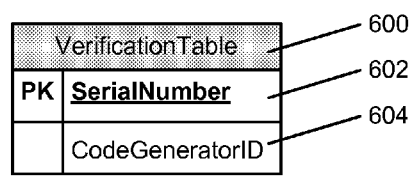
FIGS. 6A-6C show example database schemas for tables in different embodiments that link serial numbers to code generator secrets.
Figure 6B:
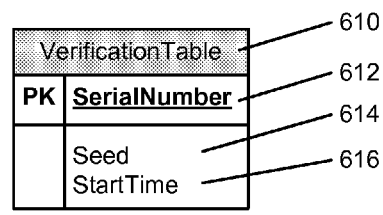

FIGS. 6A and 6B show examples of database schemas with database tables that can be used to link a singular item identifier with the code generator's secrets. For one embodiment, FIG. 6A shows a schema of a database table 600 with SerialNumber 602 as the primary key and a column CodeGeneratorID 604 as the secret. For a different embodiment, FIG. 6B shows the schema of a database table 610 with SerialNumber 612 as the primary key and where two columns, Seed 614 and StartTime 616, are the secrets. With database tables such as these shown, a lookup can be done by serial number to retrieve the secrets needed to compute the expected verification code.

Figure 6C:
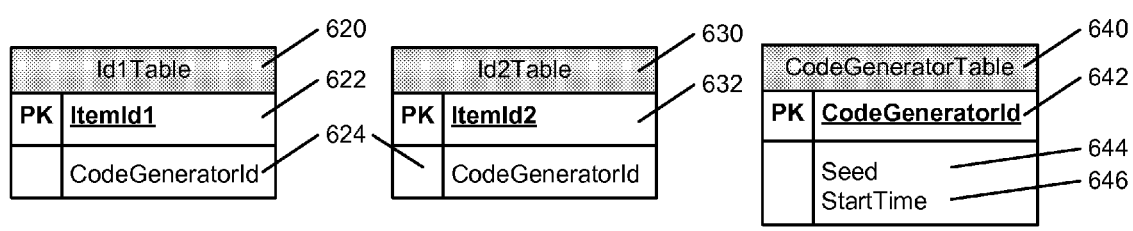

FIG. 6C shows an example of database tables that can be used to link multiple item identifiers with the secrets, as may be needed when the code generator is used to link to constituent parts of the item. Here, database tables Id1Table 620 and Id2Table 630 relate item identifiers of type ItemId1 622 and ItemId2 632 to a foreign key CodeGeneratorId 624. Database table CodeGeneratorTable 640 then provides a lookup from the primary key CodeGeneratorId 642 to the secrets Seed 644 and StartTime 646. A lookup can thus be done by ItemId1 or ItemId2 to obtain the CodeGeneratorId which in turn can be used to lookup the secrets needed to compute the expected verification code.

Providing the Code Generator with the Item

In one embodiment, a manufactured item is protected by making the code generator an integral part of the manufactured item. If the code generator is a device, then separation of the item and the code generator can be discouraged by attaching or embedding it. In this embodiment, the item can be manufactured to include the code generator.

In an alternative embodiment, accompaniment of the code generator can be encouraged by policy. A manufacturer may choose to have the code generator marked and treated as a warranty card, and it can be required for warranty or service of the protected item.

In another embodiment, it may be routine as part of the transaction for the buyer or the seller to perform a verification prior to exchanging possession of the item.

By doing this, an item that is known to be protected by a code generator and that comes without one would be greatly devalued, and it would raise caution if it was put up for sale, or brought in for service.

An unscrupulous seller could conceivably keep the genuine item and replace a protected item with a fake that had the same item identifier, but the penalty would be that the genuine item is devalued, and rendered unserviceable. Any damage is also minimized by the limited number of items that each code generator protects.

Naming the Code Generator

Placing the item identifier on the code generator as well will increase the code generator's one-stop utility as a point of contact with the manufacturer. The code generator may be used to replace the warranty card or certificate of authenticity, and the manufacturer can name it however they deem appropriate. Other possible names include an authenticator, and a validation or verification card.

Reading the Item Identifier and the Verification Code

Instructions can be provided for locating and reading the item's identifier and the code generator's current verification code. If the protected item is an electronic device, functions can be provided for accessing the stored identifier and the current verification code.

Verification

In use, anyone such as a dealer or a buyer who wishes to verify an item can use any of the channels for verification provided by the manufacturer. These may include a verification section on the manufacturer's website, or a customer service phone number with live or automated verification. The item's identifier and the current verification code would be needed to process a verification request. If the code generator is of the kind that requires the entry of a PIN code from the verification system prior to retrieving the current verification code, then this step is taken as well in preparation for verification.

Figure 7:
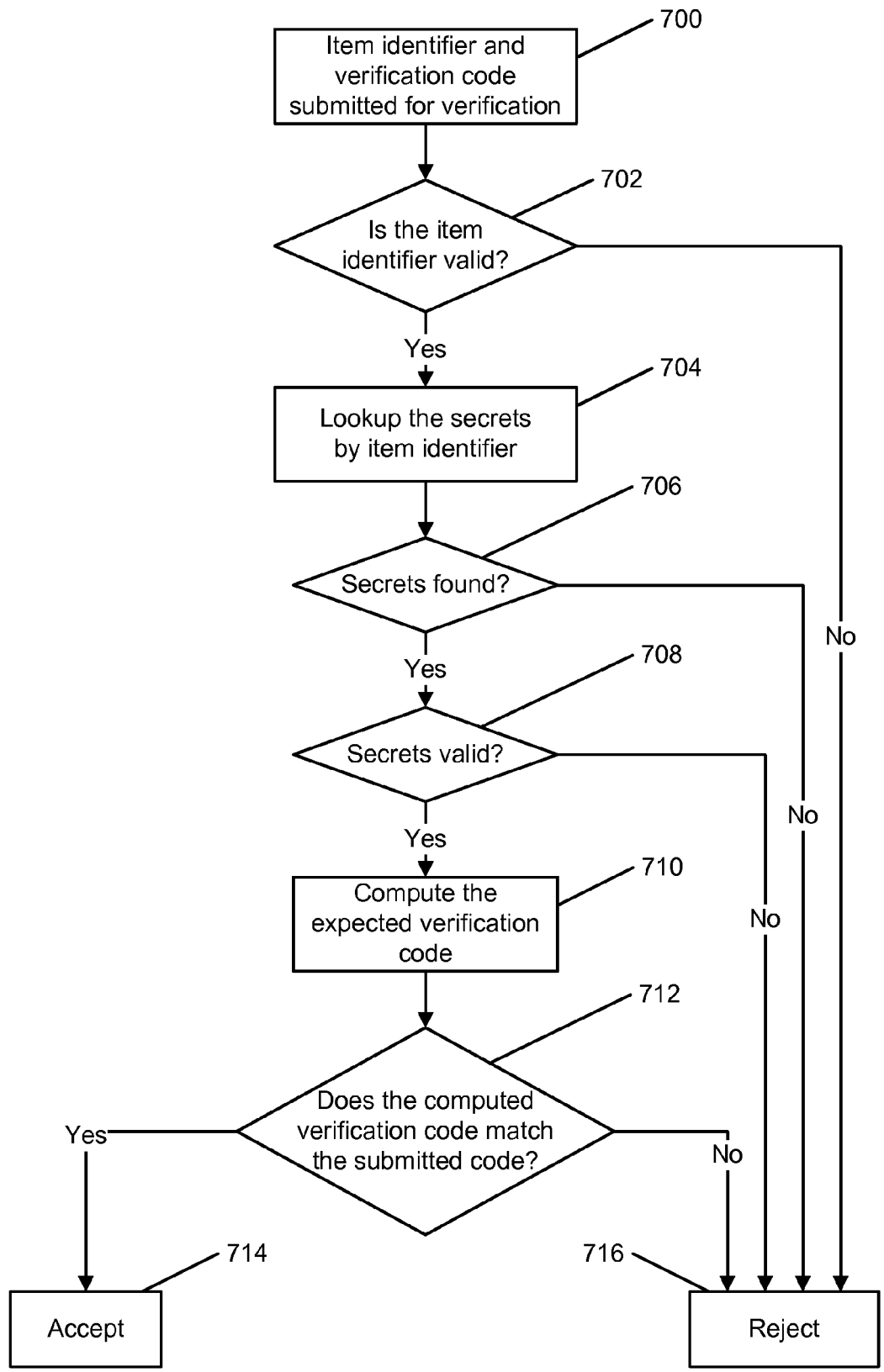
FIG. 7 is a flowchart for the verification process.

FIG. 7 shows the steps for processing a verification request in one embodiment. The verification request is made with an item identifier and the current verification code from the code generator, step 700. Checks are made to see that the item identifier is valid, step 702. This may consist of preliminary format, length and range checks, and it may reject item identifiers with invalid characters. If it is invalid, the verification request fails, step 716. Otherwise, a lookup is done to retrieve the secrets for the item identifier, step 704. A check is made to see that the secrets exist, step 706. If there are no secrets for the item identifier, the verification request fails, step 716. The possibility that the verification is revocable due to a breach is allowed, and a check is made to see that the secrets are valid, step 708. If they are invalid, the verification request fails, step 716. Otherwise, the secrets are used to compute the expected verification code, step 710. (The computation of the verification code depends on the code generator's management system and is not shown). A check is made to see if the computed verification code matches the submitted verification code, step 712. If it does not match, the verification request fails, step 716. Otherwise, the verification is successful, step 714.

With rejection, the requester can be asked to try again, subject to any verification limits.

On acceptance, the manufacturer may wish to present specifications for the item to further confirm or reinforce the verification. This may include information about the model, style, color, date of manufacture, and warranty. If the requester has identified himself/herself as a buyer, successful verification is a valuable point of contact with a high-value, brand-loyal customer where information about accessories, related items, and other sale or promotional material can be shown. In this light, and if the code generator is a warranty card, these customers can be cross-marketed, and it need not be just a warranty card but a ticket to some high-value affinity program.

As part of the verification process, the manufacturer can also choose to include special handling for item identifiers of known fakes and items that have been documented and reported as stolen.

Close-to-Real-Time Verification

For verification with time-based tokens, the manufacturer may wish to relax the strict requirement of matching the current verification code. Some leeway can be given, and some time period can be allowed within which a verification code can be accepted as valid. For example, this leeway can be half an hour. This would allow buyers to check on items that are purchased remotely and where there may be delays in exchanging information.

Figure 8:
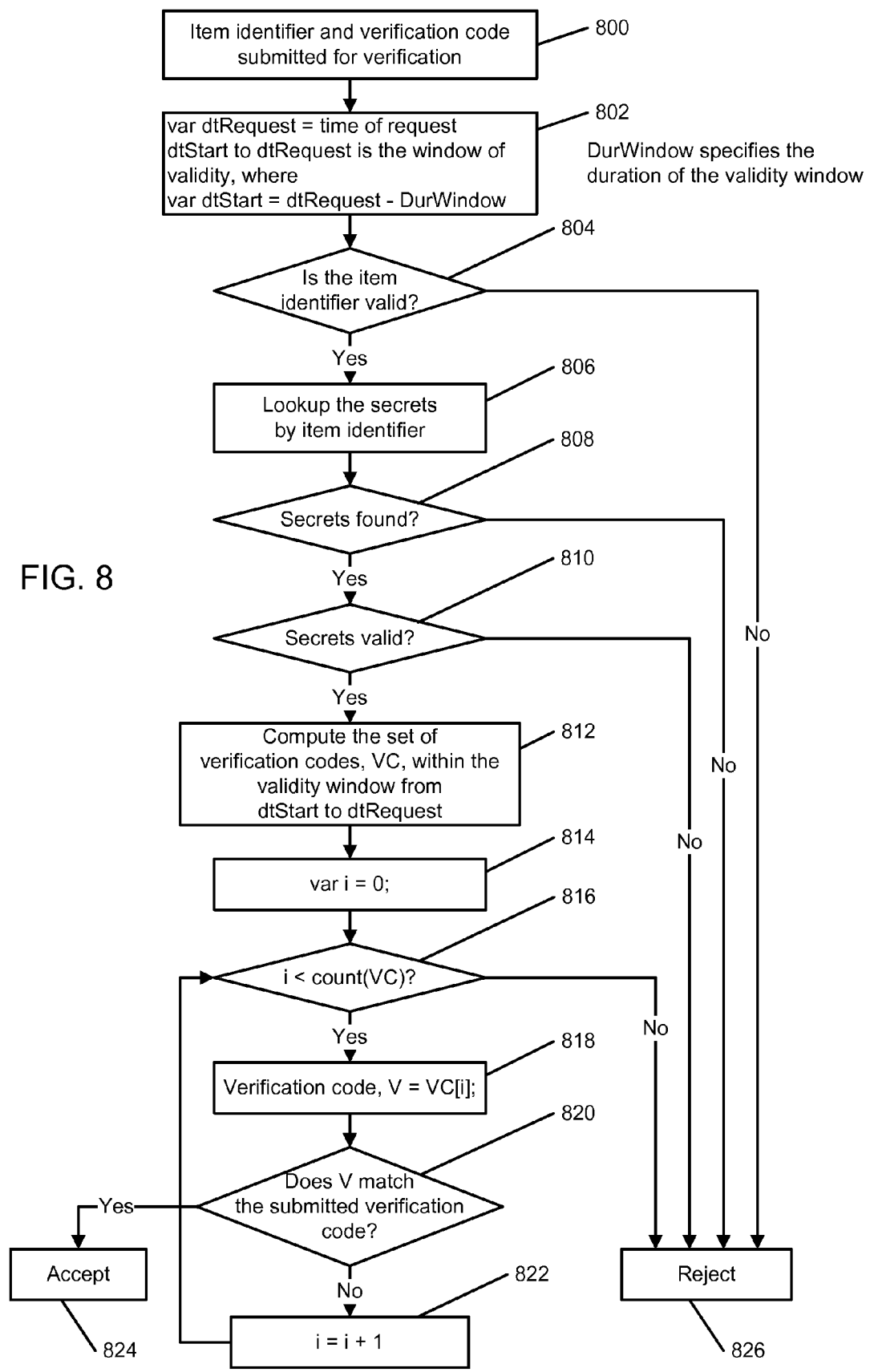
FIG. 8 is a flowchart for the close-to-real-time verification process.

FIG. 8 shows the steps for processing a close-to-real-time verification request. With such requests, there is a window of validity that proceeds the time of the verification request, and the following time variables are initialized:

1. dtRequest—date and time of the verification request.
2. DurWindow—the duration or the span of time for which a verification code is valid. In the example above, the duration is 30 minutes.
3. dtStart—the date and time of the start of the validity window, where dtStart=dtRequest−DurWindow For a verification code to be valid, it must have been valid between dtStart and dtRequest.

The verification request is made with an item identifier and a verification code from the code generator, step 800. The time variables for the request are computed, step 802. Checks are made to see that the item identifier is valid, step 804. This may consist of preliminary format, length and range checks, and it may reject item identifiers with invalid characters. If it is invalid, the verification request fails, step 826. Otherwise, a lookup is done to retrieve the secrets for the item identifier, step 806. A check is made to see that the secrets exist, step 808. If there are no secrets for the item identifier, the verification request fails, step 826. We allow the possibility that the verification is revocable due to a breach, and a check is made to see that the secrets are valid, step 810. If they are invalid, the verification request fails, step 826. Otherwise, the secrets are used to compute the set of verification codes that were valid within the window of validity, step 812. (The computation of the set of verification codes depends on the code generator's management system, and is not shown). Steps 814 to 822 step through each of the valid verification codes in the computed set. Each computed verification code is compared with the submitted code, step 820. If there is a match, the verification is accepted, step 824. Otherwise, the next computed code is retrieved, steps 822, 816, and 818. Step 816 checks to see if all the computed codes have already been compared, and if so, the verification is rejected, step 826.

With rejection, the requester can be asked to try again, subject to any verification limits.

To increase security with a large validity window, a consecutive number of verification codes can be required before verification is granted.

If the embodiment uses a verification code that has an embedded time stamp as mentioned in the description of Code Generator Design and as shown on FIG. 4C, the steps taken to compute the set of valid verification codes within the validity window would be unnecessary. What would be needed then would be to extract the time stamp, see that it is within the validity window, and compute the expected verification code for the particular time to make a comparison.

Protection of a Batch of Items

The identifier for the item does not need to be unique to each item. For example, a manufacturing lot number may be used as the item identifier to protect a batch of items. In this case, common secrets for the entire batch would be used in each of the code generators for the batch.

Protection of Constituent Items

Some products may have additional constituent parts that warrant a record or protection as well. For example, a high-end wristwatch may have individual serial numbers for the watch case and for the internal movement. The manufacturer can link a single code generator to the item identifiers of the constituent parts to provide a verifiable record of the original configuration, and authorized parties may then be able to verify the integrity of the entire item.

Security—Verification Limits

The manufacturer may limit the number of verifications for an item identifier to some number per time period. For example, there could be a limit of 10 verifications per day with overrides given for good reasons. This would stop attempts to guess at verification codes or to breach the secrets in the code generator. Temporary verification blocks may also be imposed after some number of failed verification attempts.

Security—Access Control

If there are multiple item identifiers linked to a code generator, as is the case with constituent parts, the manufacturer can set up access control for verification. For example, general users may be allowed to verify only a subset of the item identifiers, and service personnel may be allowed to check on more.

Security—Breached Code Generator and Revocation

Should it be discovered that the security of a code generator has been breached, and that counterfeits have been made of the breached item and its code generator, the link between the identifier and the code generator can be invalidated. This will stop further verifications for the breached combination of the item identifier and code generator, and it will limit the damage. The counterfeiter will then be left with marked merchandise and code generators that are unusable.

Code Generator Lifetimes

Some items like apparel may not need long-lived code generators since these items tend not to be resold, and it may be sufficient to have verification of authenticity happen at around the time of purchase. The manufacturer may find it sufficient to provide code generators that survive some number of verifications or long enough for the items to be sold and verified. This may reduce the expense of providing long-lived generators.

Brand-Wide Coverage

A manufacturer may find it advantageous to cover all products under a brand with code generators, rather than protecting individual products or lines, since once the market is aware that the entire brand is protected, any item that is sold under the brand that comes without a code generator would automatically raise caution.

Reissuing Code Generators

The manufacturer can decide on its policy for reissuing lost, damaged, or expired code generators.

Protection of a Group of Items

A code generator may be used with a group of items as well to allow verification of integrity. This may be useful for checking on an assembly of parts, or parts in a shipment. The items in the group are each marked with an identifier, and these item identifiers can be linked to a code generator's secrets as disclosed, thereby allowing someone like a recipient, forwarder or distribution person to verify there has been no tampering or substitutions. If the item identifiers are not unique to each item, then the service that is performing the verification can additionally report on the quantity of the items with the duplicate identifiers.

Figure 9:
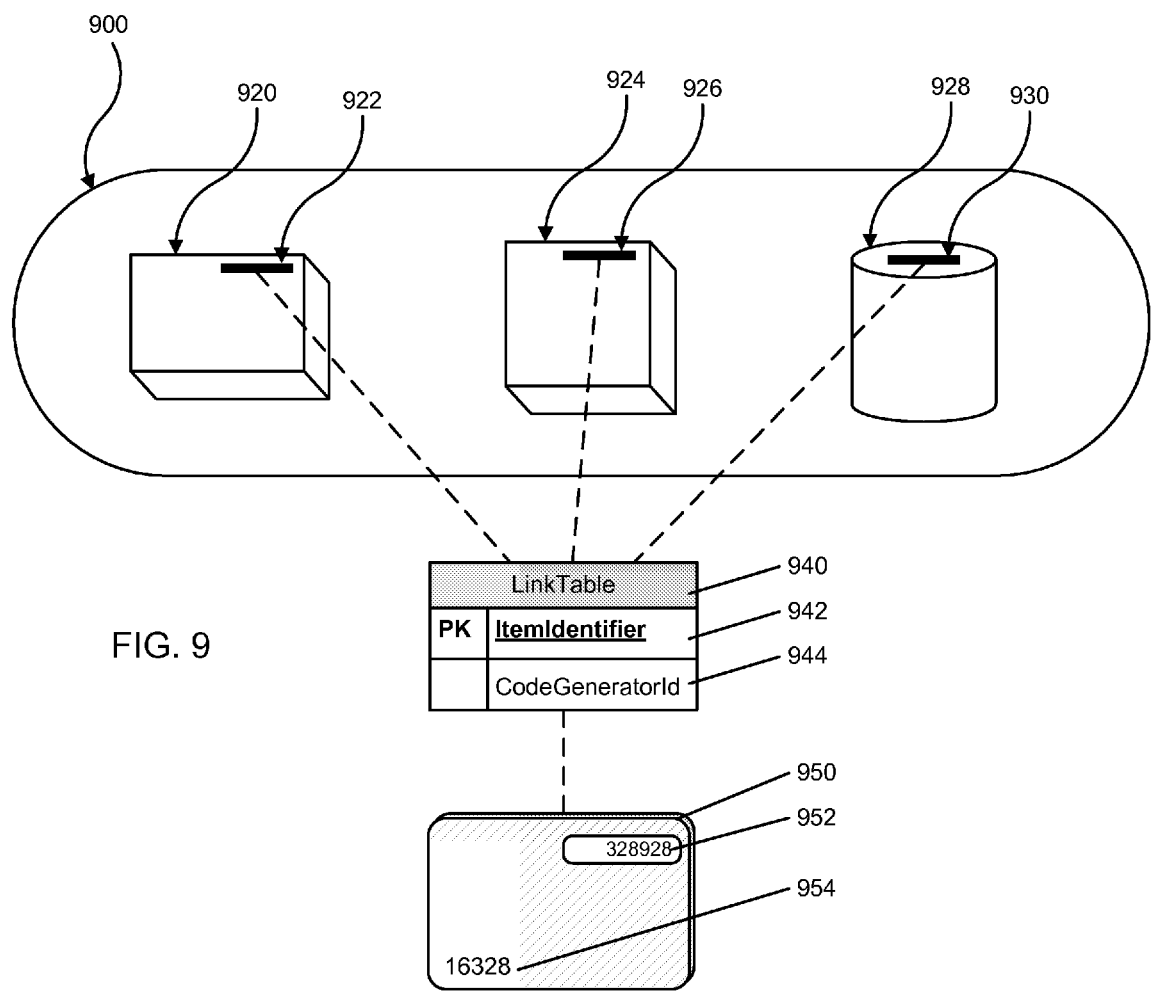
FIG. 9 shows how a code generator may be used to verify the integrity of a group of items.

FIG. 9 shows an example. A group of items 900 has manufactured items 920, 924, and 928. These items are each marked with identifiers 922, 926, and 930, respectively. These items have a code generator 950 assigned to the group. Links from each of the identifiers 922, 926, and 930 can be made to the code generator's secrets in a database with a database table such as LinkTable 940 that relates ItemIdentifiers 942 to CodeGeneratorIds 944. With this in place, verification of membership in the group of items 900 can be done with any of the identifiers 922, 926, and 930, and the current verification code 952 from the code generator 950.

If desired, the verification system can be set up to provide the entire set of identifiers in the group with one or more successful verifications. To achieve this, the code generator's secrets need to be unique. In the example, CodeGeneratorId 944 needs to be a foreign key into another table (not shown). With such a setup, a lookup can be done within LinkTable 940 for all ItemIdentifiers 942 matching a given CodeGeneratorId 944. The set of identifiers in the group can thus be obtained.

As an alternative to verification with an identifier (one of 922, 926, and 930) and the current verification code 952, verification can also be done with the code generator's ID 954, if the code generator is so marked, and the current verification code 952. Possession of the code generator can then be verified by matching the current verification code 952 with the expected verification code calculated with the code generator's ID 954. The set of identifiers in the group can then be obtained with the same database query as above.

Roles

The disclosure has stated or implied that the manufacturer is the entity that associates an item identifier with the item, associates the item identifier with the code generator's secrets, and is the provider of the verification service. This should not be taken as a limitation. Where feasible, these different tasks and roles, in whole or in part, can be provided or undertaken by any entity. This may include representatives and agents of the manufacturer, as well as independent entities such as appraisers, auctioneers, insurers, certification authorities, and testing facilities, or a third party authentication and verification service. For example, a manufacturer may send to a third party a set of identifiers and the third party associates the identifiers with code generators, and then sends the associated code generators back to the manufacturer.

A method and system for protecting manufactured items has been disclosed. Counterfeiters and sellers of fakes are thwarted with code generators because even if they can make perfect copies of items with legitimate serial numbers and all their accompanying materials like certificates of authenticity, warranty cards and packaging, they would not be able to produce code generators with the correct secrets.

Unlike current overt anti-counterfeiting markers, stolen or purchased code generators are of no use because they require additional links from item identifiers to the code generator secrets that manufacturers create and guard.

In the case of theft or the unlikely breach of a code generator's secrets, manufacturers still have the ability to revoke verification easily by invalidating the link in the verification database, and the damage will be limited. For the consumer, verification is easy and it does not require any specialized scanners or hardware. A protected item that is sold without a code generator, or a seller who cannot provide valid verification codes will raise a red flag and the item can be rejected immediately. With the code generator, a buyer can run a check by visiting the manufacturer's website, or by making a call to the company. If the buyer and seller are physically far apart, remote verification is also easy since only the identifier and verification codes need to be exchanged.

The manufacturer gains protection from brand piracy and benefits with increased sales. Buyers gain assurance that the item they are purchasing is real, and they become less susceptible to fraud. Any manufactured item that can be marked with an identifier can be protected with this method.

The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

I claim:

1. A method for protecting a manufactured item from being mass produced for fraudulent sale, the manufactured item being marked with an identifier, the method comprising:

storing a secret seed in a code generator, the code generator being a hardware device;

storing the secret seed in one or more databases in association with the code generator;

assigning the code generator to a manufactured item by linking, in the one or more databases, the secret seed with the identifier marked on the manufactured item;

generating by the code generator multiple verification codes by execution of an algorithm in the code generator that uses the secret seed as input, the code generator being supplied with the manufactured item for generation of the multiple verification codes during at least one of shipment, sale and warranty of the manufactured item;

receiving by a management system a request for verification of the manufactured item during the at least one of shipment, sale and warranty of the manufactured item, the request including the identifier of the manufactured item, and one of the multiple verification codes generated by the code generator;

using by the management system the identifier received in the request to look up in the one or more databases the secret seed of the code generator; and validating the manufactured item by the management system by generating an expected verification code using the secret seed, and comparing the expected verification code to the current verification code from the request.

2. The method of claim 1, wherein the storing in one or more databases the secret seed, further comprises:
   storing a plurality of information used by a management system to compute the expected verification code.

3. The method of claim 1, wherein the identifier comprises any combination of being human readable, being machine readable, being overtly placed, and being covertly placed.

4. The method of claim 1, wherein the identifier is at least one of being unique to each manufactured item, and being unique to a plurality of manufactured items.

5. The method of claim 1, wherein the assigning the code generator to the manufactured item further comprises linking, in one or more databases, additional identifiers associated with constituent parts of the manufactured item.

6. A method of verifying the integrity of a group of manufactured items, each one of the manufactured items in the group being marked with a respective identifier, the method comprising:
   storing a secret seed in a code generator, the code generator being a hardware device;
   storing the secret seed in one or more databases in association with the code generator;
   assigning the code generator to a group of manufactured items by linking, in the one or more databases, the secret seed with the respective identifiers marked on the group of manufactured items;
   generating by the code generator multiple verification codes by execution of an algorithm in the code generator that uses the secret seed as input, the code generator being supplied with the group of manufactured items for generation of the multiple verification codes during at least one of shipment, sale and warranty of the group of manufactured items;
   receiving by a management system a request for verification of at least one of the group of manufactured items as the group of manufactured items is the at least one of shipped, on sale, and during warranty, the request including the identifier of the at least one of the group of manufactured items, and one of the multiple verification codes generated by the code generator;
   using by the management system the identifier received in the request to look up in the one or more databases the secret seed of the code generator; and
   validating the group of manufactured items by the management system by generating an expected verification code using the secret seed, and comparing the expected verification code to the current verification code from the request.

7. The method of claim 6, wherein the storing in one or more databases the secret, further comprises:
   storing a plurality of information used by a management system to compute the expected verification code.

8. The method of claim 6, wherein each of the respective identifiers comprises any combination of being human readable, being machine readable, being overtly placed, and being covertly placed.

9. The method of claim 6, further comprising using a plurality of the respective identifiers and at least one of the multiple verification codes generated by the code generator to obtain the set of item identifiers belonging to the manufactured items in the group.

10. The method of claim 6, further comprising using the code generator's secret seed to obtain the set of item identifiers belonging to the manufactured items in the group.

11. A computer readable medium containing program instructions, which when executed by at least one processor, cause the at least one processor to perform a method for protecting a manufactured item from being mass produced for fraudulent sale, the manufactured item being marked with an identifier, the program instructions for:
   storing a secret seed in a code generator, the code generator being a hardware device;
   storing the secret seed in one or more databases in association with the code generator;
   assigning the code generator to a manufactured item by linking, in the one or more databases, the secret seed with the identifier marked on the manufactured item;
   generating by the code generator multiple verification codes by execution of an algorithm in the code generator that uses the secret seed as input, the code generator being supplied with the manufactured item for generation of the multiple verification codes during at least one of shipment, sale and warranty of the manufactured item;
   receiving by a management system a request for verification of the manufactured item during the at least one of shipment, sale and warranty of the manufactured item, the request including the identifier of the manufactured item, and one of the multiple verification codes generated by the code generator;
   using by the management system the identifier received in the request to look up in the one or more databases the secret seed of the code generator; and
   validating the manufactured item by the management system by generating an expected verification code using the secret seed, and comparing the expected verification code to the current verification code from the request.

12. A computer readable medium containing program instructions, which when executed by at least one processor, cause the at least one processor to perform a method for verifying the integrity of a group of manufactured items, each one of the manufactured items in the group being marked with a respective identifier, the program instructions for:
   storing a secret seed in a code generator, the code generator being a hardware device;
   storing the secret seed in one or more databases in association with the code generator;
   assigning the code generator to a group of manufactured items by linking, in the one or more databases, the secret seed with the respective identifiers marked on the group of manufactured items;
   generating by the code generator multiple verification codes by execution of an algorithm in the code generator that uses the secret seed as input, the code generator being supplied with the group of manufactured items for generation of the multiple verification codes during at least one of shipment, sale and warranty of the group of manufactured items;
   receiving by a management system a request for verification of at least one of the group of manufactured items as the group of manufactured items is the at least one of shipped, on sale, and during warranty, the request including the identifier of the at least one of the group of manufactured items, and one of the multiple verification codes generated by the code generator;
   using by the management system the identifier received in the request to look up in the one or more databases the secret seed of the code generator; and
   validating the group of manufactured items by the management system by generating an expected verification code using the secret seed, and comparing the expected verification code to the current verification code from the request.

* * * * *